US009291208B2

United States Patent
Sakai

(10) Patent No.: US 9,291,208 B2
(45) Date of Patent: Mar. 22, 2016

(54) ROTATION TRANSMITTER

(71) Applicant: MITUTOYO CORPORATION, Kawasaki-shi, Kanagawa (JP)

(72) Inventor: Hisayoshi Sakai, Kawasaki (JP)

(73) Assignee: MITUTOYO CORPORATION, Kawasaki-Shi (JP)

( * ) Notice: Subject to any disclaimer, the term of this patent is extended or adjusted under 35 U.S.C. 154(b) by 16 days.

(21) Appl. No.: 14/275,931

(22) Filed: May 13, 2014

(65) Prior Publication Data
US 2014/0342840 A1 Nov. 20, 2014

(30) Foreign Application Priority Data

May 15, 2013 (JP) .................................. 2013-102824

(51) Int. Cl.
*F16D 3/04* (2006.01)
*F16D 3/82* (2006.01)
*F16D 3/02* (2006.01)
(Continued)

(52) U.S. Cl.
CPC .............. *F16D 3/82* (2013.01); *F16C 32/0603* (2013.01); *F16D 3/02* (2013.01); *F16D 3/80* (2013.01)

(58) Field of Classification Search
CPC ......... F16C 32/0603; F16D 3/02; F16D 3/80; F16D 3/82
USPC ......... 464/18, 19, 24, 29, 102; 33/27.07, 550; 384/12; 403/331, 340; 702/167
See application file for complete search history.

(56) References Cited

U.S. PATENT DOCUMENTS 2,950,610 A * 8/1960 Stier ....................... F02D 1/183
464/24 X
3,440,887 A * 4/1969 Athanas .................. F16C 32/06
33/550
5,098,203 A 3/1992 Henderson
(Continued)

FOREIGN PATENT DOCUMENTS

JP 63-219916 A * 9/1988
JP 3-17058 4/1991
(Continued)

OTHER PUBLICATIONS

Dvorak, Denny Z., The Rundown on Linear Ball Bearings, Machine Design, Sep. 1, 2000, retrieved online [Sep. 11, 2015] <http://machinedesign.com/linear-motion/rundown-linear-baal-bearings>.*

(Continued)

*Primary Examiner* — Gregory Binda
(74) *Attorney, Agent, or Firm* — Rankin, Hill & Clark LLP

(57) ABSTRACT

A rotation transmitter includes: a first member, an intermediate member and a second member that are arranged coaxially with a rotation axis. The first member is formed with a first bearing surface along the rotation axis and a first direction. The second member is formed with a second bearing surface along the rotation axis and a second direction. The intermediate member is formed with a first middle bearing surface facing the first bearing surface and formed with a second middle bearing surface facing the second bearing surface. A static-pressure air bearing is formed between the bearing surface and the middle bearing surface. The rotation transmitter further includes: a preload device that biases the bearing surface and the middle bearing surface in a direction approaching each other.

6 Claims, 11 Drawing Sheets

(51) Int. Cl.
  *F16D 3/80*  (2006.01)
  *F16C 32/06* (2006.01)

(56) References Cited

U.S. PATENT DOCUMENTS 6,727,616 B1    4/2004  Gabrys et al.
7,802,939 B2 *  9/2010  Bushey ................ B25J 17/0275
2006/0139615 A1 6/2006  Mee et al.

FOREIGN PATENT DOCUMENTS

JP    H03-163221    7/1991
WO    2009/020592   2/2009

OTHER PUBLICATIONS

European Search Report dated Oct. 10, 2014, 6 pages.

* cited by examiner

ROTATION TRANSMITTER

The entire disclosure of Japanese Patent Application No. 2013-102824 filed May 15, 2013 is expressly incorporated by reference herein.

BACKGROUND OF THE INVENTION

1. Field of the Invention

The present invention relates to a rotation transmitter that interconnects two rotatable members and transmits mutual rotations of the two members while tolerating an angular misalignment, a parallel misalignment and an axial displacement of rotation axes of the connected members.

2. Description of Related Art

Typically, when two rotatable members are interconnected to transmit mutual rotations by, for instance, extending a rotary shaft or connecting another rotary component to an end of a rotary shaft, various types of rotation transmitters are used. Such a rotation transmitter is called a shaft coupling, joint, or coupling.

The rotation transmitter is required to mutually transmit rotation forces and rotation angle positions between the two connected rotary members as a basic function. Further, when the rotation transmitter is applied to a highly accurate rotation mechanism such as a roundness measuring instrument, the rotation transmitter is required to tolerate an angular misalignment, a parallel misalignment and an axial displacement of the rotation axes of the connected members.

In the roundness measuring instrument, a rotation accuracy of a table on which a workpiece is mounted is enhanced in order to measure roundness of an outer periphery of the workpiece at a high accuracy. In order to rotate the table, a driving shaft for transmitting a rotation force is connected to the table.

Herein, there is inevitably an angular misalignment (an angle of deviation, an inclination of each of central rotation axes), a parallel misalignment (eccentricity, misalignment in an intersecting direction of the central rotation axes) and an axial displacement (deviation of the central rotation axes in an axial direction, axial advance and retraction) between the table and the driving shaft.

When such angular misalignment, parallel misalignment and axial displacement of the rotation axes are directly transmitted from the driving shaft to the table, the rotation accuracy of the table is occasionally affected.

In order to solve the above problem, various rotation transmitters (a universal joint, flexible joint or flexible coupling) capable of reducing or absorbing the angular misalignment, parallel misalignment and axial displacement as described above have been conventionally proposed.

Specifically, examples of the known rotation transmitters include: a so-called disk-type universal joint that uses elastic deformation of a disk in a direction orthogonal to the rotation axis; a cross joint type universal joint that includes two connection pins respectively disposed in a direction orthogonal to the rotation axis and in directions intersecting with each other; and an Oldham universal joint that includes two sets of slide structures, in which each of the slide structures includes a concave component and a convex component that extend in the intersecting directions, and the slide structures are combined in the intersecting direction to transmit rotation.

Among the above rotation transmitters, the Oldham rotation transmitter has a sufficient tolerance to an angular misalignment, a parallel misalignment and axial displacement of the rotation axes.

By using a static-pressure air bearing in the two sets of slide mechanisms in the Oldham rotation transmitter, slide resistance of the slide structures is significantly reduced and a follow-up performance of the slide structures in response to the angular misalignment, parallel misalignment and axial displacement of the rotation axes is enhanced, whereby a more highly accurate rotation transmission is expected to be achievable.

Specifically, there has been proposed a static-pressure rotary joint in which a pair of static-pressure air bearings are provided between inner opposing surfaces of the concave component and outer side surfaces of the convex component, the concave component and the convex component facing each other, in the slide mechanisms of the Oldham rotation transmitter (see Patent Literature 1: JP-UM-3-17058).

In the above static-pressure rotary joint of Patent Literature 1, with the Oldham base arrangement, a sufficient tolerance to the angular misalignment, parallel misalignment and axial displacement is obtained. Moreover, by using the static-pressure air bearing in each of the two sets of slide mechanisms, slide resistance of the slide mechanisms is significantly reduced and follow-up performance in response to the angular misalignment, parallel misalignment and axial displacement is enhanced, whereby a more highly accurate rotation transmission is expected.

However, since the above slide mechanism of the Oldham rotation transmitter is structured such that the convex component is fitted into the concave component so as to be guided in the direction intersecting with the rotation axis, it is difficult to apply the static-pressure air bearing to the rotation transmitter.

Specifically, in the static-pressure air bearing, a slight clearance for forming an air film is necessary between opposing bearing surfaces. This clearance varies depending on operation conditions such as applied loads and supply air pressure.

However, since an inner width of the concave component and a thickness of the convex component are fixed in the above slide mechanism of the Oldham rotation transmitter, the clearance between the concave component and the convex component is also fixed and it is difficult to adjust a dimension of the clearance to an appropriate one as a static-pressure air bearing. Moreover, it is difficult to manufacture the Oldham rotation transmitter having a structure to adjust the dimension of the clearance to an appropriate value.

Because of the adjustment or the difficulty in manufacturing, use of the static-pressure air bearing in the slide mechanism of the Oldham rotation transmitter entails difficulty.

Even when the clearance is adjusted to an appropriate one between the inner bearing surfaces of the concave component and the outer bearing surfaces of the convex component, if the rotation axis is inclined or the like in operation, the convex component is inclined within the concave component, so that a corner or the like of the convex component is possibly brought into contact with the inner surface of the concave component.

In Patent Literature 1 applied to a machine tool, although a smooth operation is disturbed, a processing operation can be maintained. However, when the above slide mechanism is applied to a device of measuring a minute displacement (e.g., a roundness measuring instrument), occurrence of contact or the like of the components severely affects an accuracy of measurement results.

Further, the first member and the second member of which rotation is transmitted via an intermediate member between two slide mechanisms are connected by a static-pressure air bearing without a mechanical connection. Accordingly, in Patent Literature 1, a retainer (fixing members 1 and 15) are provided to support a weight of the intermediate member (distribution members 3 and 17 and joint members 4, 5, 18 and 19).

However, when the intermediate member is supported by such a retainer, a movement (in response to an angular misalignment, a parallel misalignment and an axial displacement of the rotation axis) of the intermediate member is restricted. Accordingly, such an arrangement of using the retainer is not sufficient for the roundness measuring instrument that requires a higher accuracy than the machine tool of Patent Literature 1. Consequently, a high accuracy is possibly not obtained even using the static-pressure air bearing.

Further, in Patent Literature 1, pressurized air is supplied to the static-pressure air bearings of the two slide mechanisms through the retainer. The static-pressure air bearings of the two slide mechanisms rotate together with rotary shafts. In order to externally supply the pressurized air to the rotating static-pressure air bearings, a rotatable connection mechanism is required. The retainer and the intermediate member are used as such a connection mechanism.

Accordingly, the retainer plays a functionally important role in the arrangement of the Patent Literature 1, so that removal of the retainer is difficult.

Thus, the use of the retainer results in failure in obtaining a sufficiently high accuracy of a rotation transmitter for a measuring instrument.

SUMMARY OF THE INVENTION

An object of the invention is to provide a rotation transmitter capable of exhibiting a high rigidity and a high accuracy and capable of being easily manufactured and adjusted.

In the invention, an Oldham rotation transmitter is fundamentally used. Further, each of two slide mechanisms is provided by a single static-pressure air bearing formed by a set of opposing surfaces of respective components instead of a typical pair of static-pressure air bearings. With this arrangement, easy manufacturing and adjustment of the bearings are secured. Moreover, a high accuracy and a high rigidity provided using the static-pressure air bearing can be effectively exhibited by removing the retainer. The removal of the retainer is achieved by using a preload means for stably operating the static-pressure air bearing formed by a set of opposing surfaces of respective components and by securing a rotation capability of the supply path of pressurized air.

Specifically, the invention includes arrangement as follows.

According to an aspect of the invention, A rotation transmitter interconnecting a pair of rotary members that rotate around a common rotation axis, includes: a first member, an intermediate member and a second member that are arranged coaxially with the rotation axis, in which the first member has a first bearing surface formed along the rotation axis and a first direction intersecting with the rotation axis, the second member has a second bearing surface formed along the rotation axis and a second direction intersecting with the rotation axis and the first direction, the intermediate member has a first middle bearing surface that faces the first bearing surface and a second middle bearing surface that faces the second bearing surface, and a first static-pressure air bearing is formed between the first bearing surface and the first middle bearing surface and a second static-pressure air bearing is formed between the second bearing surface and the second middle bearing surface, the rotation transmitter further including: a first preload device that biases the first bearing surface and the first middle bearing surface in a direction approaching each other; and a second preload device that biases the second bearing surface and the second middle bearing surface in a direction approaching each other.

Herein, each of the first bearing surface, the first middle bearing surface, the second bearing surface and the second middle bearing surface is provided on a single surface of a component along the rotation axis. Each of the first bearing surface, the first middle bearing surface, the second bearing surface and the second middle bearing surface may be suitably formed as a surface of a later-described block.

In the first and second static-pressure air bearings, an air supply groove is formed on a surface of one of the facing first bearing surface and first middle bearing surface and on a surface of one of the facing second bearing surface and second middle bearing surface. An air supply path that serves as a connection hole to the air supply groove is formed in the first, second or intermediate member. The first and second static-pressure air bearings may be restricted by an orifice near an outlet of each of the air supply paths, or may be surface restrictors that obtain a restricting effect by the air supply grooves.

The first and second preload devices can be provided by a later-described magnet. Alternatively, the first member and the intermediate member may be connected by a resilient/elastic member to bring the first bearing surface and the first middle bearing surface close to each other, or the second member and the intermediate member may be connected by a resilient/elastic member to bring the second bearing surface and the second middle bearing surface close to each other. A coil spring and an elastomer material may be used as the elastic member.

In the above aspect of the invention, rotation is transmitted from the first member to the intermediate member through the first static-pressure air bearing, and subsequently, the rotation is transmitted from the intermediate member to the second member through the second static-pressure air bearing.

The first static-pressure air bearing is displaceable in the first direction and in a direction of the rotation axis while the second static-pressure air bearing is displaceable in the second direction and in the direction of the rotation axis. Accordingly, in the first member and the second member, since a high follow-up performance in response to the angular misalignment, parallel misalignment and axial displacement of the rotation axes and a high rigidity as a static-pressure air bearing are obtained. Specifically, in order to solve an alignment error such as the angular misalignment, parallel misalignment and axial displacement of the rotation axes between the first member and the second member when assembled and a motion error such as the angular misalignment, parallel misalignment and axial displacement of the rotation axes between the first member and the second member when each independently rotated, without mutual interference of the first member and the second member, rotation can be transmitted at a high accuracy according to synchronicity of the rotation angles of the rotation axes due to the rigidity of the static-pressure air bearing. Accordingly, geometric motion components other than the rotation angles of the rotation axes are not transmitted. Consequently, rotation can be transmitted at a high accuracy.

Further, since the first static-pressure air bearing and the second static-pressure air bearing are respectively formed between the surfaces of the first member and the intermediate member and the surfaces of the intermediate member and the second member, each of the first static-pressure air bearing and the second static-pressure air bearing can be easily manufactured and adjusted unlike an arrangement of a conventional static-pressure air bearing including a pair of the concave component and the convex component to be fitted to each other.

Herein, each of the first static-pressure air bearing and the second static-pressure air bearing is provided by a single side of each of the first member and the second member and the opposing sides of the intermediate member. By including the first preload device and the second preload device, the first static-pressure air bearing and the second static-pressure air bearing can reliably maintain the clearance and obtain preload as a static-pressure air bearing.

Thus, the rotation transmitter according to the above aspect of the invention can exhibit a high rigidity and a high accuracy and can be easily manufactured and adjusted.

In the rotation transmitter according to the above aspect of the invention, preferably, the first member includes: a first member body; and a first connection block that is provided on the first member body near the intermediate member and has the first bearing surface on a side surface of the first connection block, the second member comprises: a second member body; and a second connection block that is provided on the second member body near the intermediate member and has the second bearing surface on a side surface of the second connection block, and the intermediate member comprises: a first middle block that has the first middle bearing surface on a side surface of the first middle block; and a second middle block that has the second middle bearing surface on a side surface of the second middle block.

With this arrangement, the first member body, first connection block, second member body, second connection block, first middle block and second middle block can be manufactured separately and subsequently connected, so that a basic structure of the rotation transmitter of the above aspect of the invention can be easily manufactured.

These blocks may be connected by being fastened with bolts or the like, or may be connected by bonding, welding and other means.

It should be noted that the invention may be manufactured not only by mutually connecting the blocks, but also by cutting out a single body instead of several blocks.

In the rotation transmitter according to the above aspect of the invention, preferably, the first preload device is a first preload magnet that is provided to the first member or the intermediate member, and the second preload device is a second preload magnet that is provided to the second member or the intermediate member.

With this arrangement, using the first and second preload magnets, the first static-pressure air bearing and the second static-pressure air bearing can reliably maintain the clearance and obtain preload without contact (i.e., without transmission of vibration and external force in a direction other than a preload direction).

The first and second preload magnets can be buried at positions of the first member, the second member or the intermediate member facing the first and second static-pressure air bearings, thereby simplifying the structure. In addition, since the structure has no projection, interference with the surroundings can be avoided.

It is desirable to use a permanent magnet as the magnet. When the first member, the second member or the intermediate member is formed of a magnetic substance (e.g., iron), no problem occurs. However, when the first member, the second member or the intermediate member is formed of a non-magnetic substance, it is desirable to bury or the like a magnetic substance at a position facing each of the first and second preload magnets, thereby performing magnetic attraction.

In the rotation transmitter according to the above aspect of the invention, preferably, the rotation axis is vertically disposed, and floating magnets repulsive to each other are respectively provided on a surface of the intermediate member and a surface of a vertically lower one of the first member and the second member opposing the surface of the intermediate member.

With this arrangement, the intermediate member can be supported in a floating state by the floating magnets, so that the retainer in the aforementioned Patent Literature 1 can be omitted.

As the arrangement of the floating magnets, for instance, a first permanent magnet with the South pole facing upward is circumferentially buried on a vertically lower one of the first and second members, while a second permanent magnet with the South pole facing downward is buried at a position of the intermediate member corresponding to the first permanent magnet. With this arrangement, the same poles face each other to be repulsive. In this arrangement, as long as the floating magnets are circumferentially arranged on the intermediate member or one of the first and second member, the floating magnets may be intermittently arranged on the other opposing member.

When the rotation axis is horizontal or the like, a usable arrangement is exemplified by an arrangement in which a support ring is provided on an outer circumference of the intermediate member and magnets are provided facing outward on the outer circumference of the intermediate member while magnets repulsive are provided to a support member of the intermediate member.

In the rotation transmitter according to the above aspect of the invention, preferably, the first member is formed with an axial air supply path that extends along the rotation axis from an end opposite to the intermediate member toward the intermediate member, and the axial air supply path is provided with a coupler at an end opposite to the intermediate member, the coupler being rotatable around the rotation axis and being externally supplied with pressurized air.

With this arrangement, pressurized air is supplied through the coupler rotatable around the rotation axis and the axial air supply path. Accordingly, even when the first member, second member and intermediate member rotate together, the pressurized air can be supplied without tubes and the like being tangled.

Moreover, since the pressurized air is thus supplied, the retainer in the aforementioned Patent Literature 1 can be omitted.

When the rotation axis is vertical, the first member to which the coupler and the axial air supply path are provided may be positioned on an upper side or a lower side of the intermediate member. It is only required that a member to be supplied with the pressurized air is defined as the first member and a member opposite to the first member is defined as the second member.

In the rotation transmitter according to the above aspect of the invention, the intermediate member preferably includes thereinside: a first air supply path that is interconnected to the axial air supply path and supplies the pressurized air to the first static-pressure air bearing; and a second air supply path that is interconnected to the axial air supply path and supplies the pressurized air to the second static-pressure air bearing.

With this arrangement, the pressurized air supplied to the coupler and the axial air supply path is supplied to the first and second static-pressure air bearings after being distributed by the first and second air supply paths.

Herein, the distribution of the pressurized air from the axial air supply path to the first and second air supply paths may be conducted by connecting a tube to a side surface of each of the first member and the intermediate member. Even when the tube is provided, since the first member and the intermediate member rotate together, no functional problem occurs. However, it is desirable to handle the interference with the surroundings in consideration of the tube.

In the rotation transmitter according to the above aspect of the invention, the intermediate member preferably includes thereinside: a first air supply path that is interconnected to the axial air supply path and supplies the pressurized air to the first static-pressure air bearing; and a second air supply path that is interconnected to the first static-pressure air bearing and supplies the pressurized air to the second static-pressure air bearing.

With this arrangement, the pressurized air supplied to the coupler and the axial air supply path can be supplied to the first static-pressure air bearing through the first air supply path, while the pressurized air supplied to the first static-pressure air bearing can be supplied to the second static-pressure air bearing through the second air supply path.

Since the supply of the pressurized air is conducted through the first static-pressure air bearing, the first static-pressure air bearing needs to be not an orifice restrictor but a surface restrictor. When the first static-pressure air bearing is provided by a surface restrictor, a sufficient volume of the pressurized air relative to the pressurized air that flows out and forms an air film is stored in the air supply groove. The pressurized air stored in the air supply groove is under a pressure equivalent to that of an external supply source. Accordingly, when the pressurized air is supplied to the second static-pressure air bearing through the second air supply path, the second static-pressure air bearing can play a predetermined function as the static-pressure air bearing.

With this arrangement, since the first static-pressure air bearing and the second static-pressure air bearing are formed between the first member and the second member, a high follow-up performance in response to the angular misalignment, parallel misalignment and axial displacement of the rotation axes is obtained, and further, a high rigidity as a static-pressure air bearing is obtained. Specifically, in order to solve an alignment error such as the angular misalignment, parallel misalignment and axial displacement of the rotation axes between the first member and the second member when assembled and a motion error such as the angular misalignment, parallel misalignment and axial displacement of the rotation axes between the first member and the second member when each independently rotated, without mutual interference of the first member and the second member, rotation can be transmitted at a high accuracy according to synchronicity of the rotation angles of the rotation axes due to the rigidity of the static-pressure air bearing. Accordingly, geometric motion components other than the rotation angles of the rotation axes are not transmitted. Consequently, rotation can be transmitted at a high accuracy. Further, each of the first static-pressure air bearing and the second static-pressure air bearing is provided by a single side of each of the first member and the second member and the opposing sides of the intermediate member, so that manufacturing and adjustment of the first static-pressure air bearing and the second static-pressure air bearing are easy. On the other hand, by including the first preload device and the second preload device, the first static-pressure air bearing and the second static-pressure air bearing can reliably maintain the clearance and obtain preload as a static-pressure air bearing.

Thus, the rotation transmitter according to the above aspect of the invention can exhibit a high rigidity and a high accuracy and can be easily manufactured and adjusted.

DESCRIPTION OF EMBODIMENT(S)

Embodiments of the invention will be described below with reference to the attached drawings.

First Exemplary Embodiment

FIGS. 1 to 6 show a first exemplary embodiment of the invention.

Figure 1:
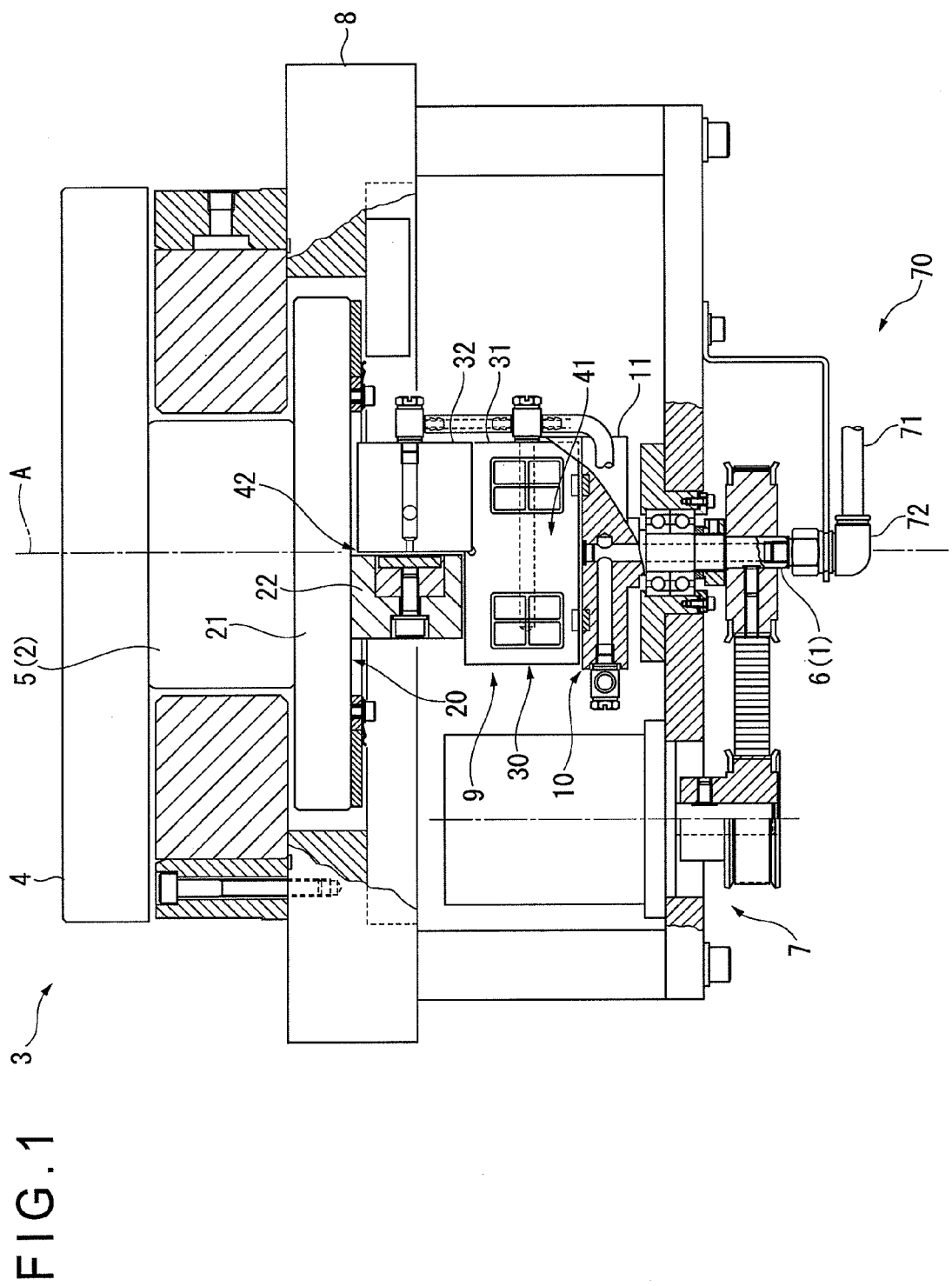
FIG. 1 is a partially cutaway side view showing a first exemplary embodiment of the invention.

In FIG. 1, a rotation transmitter 9 according to the first exemplary embodiment interconnects a pair of rotary members 1 and 2 that rotate around a common rotation axis A.

In the first exemplary embodiment, the rotary members 2 and 1 respectively refers to a rotary shaft 5 of a turntable 4 provided in a roundness measuring instrument 3 and a driving shaft 6 that rotates the rotary shaft 5.

In FIG. 1, the turntable 4, the rotary shaft 5 and the driving shaft 6 are supported by a common frame 8 and are rotatable around the common rotation axis A.

The driving shaft 6 is rotated by a driving mechanism 7. The driving mechanism 7 includes: a motor supported by the frame 8; and a cogged belt and a pulley that transmit a rotation force of the motor to the driving shaft 6. The rotation provided by the driving mechanism 7 is transmitted from the driving shaft 6 to the rotary shaft 5 and the turntable 4 through the rotation transmitter 9 of the invention.

The rotary members 1 and 2 each may be a rotation-transmitting part of other measuring instruments or a rotation-transmitting part of devices other than the measuring instruments, which are required to have a high accuracy. As long as a pair of rotary members transmit a predetermined torque and are required to have a high angular-position accuracy, the invention is applicable to such a pair of rotary members serving as the rotary members 1 and 2.

Figure 2:
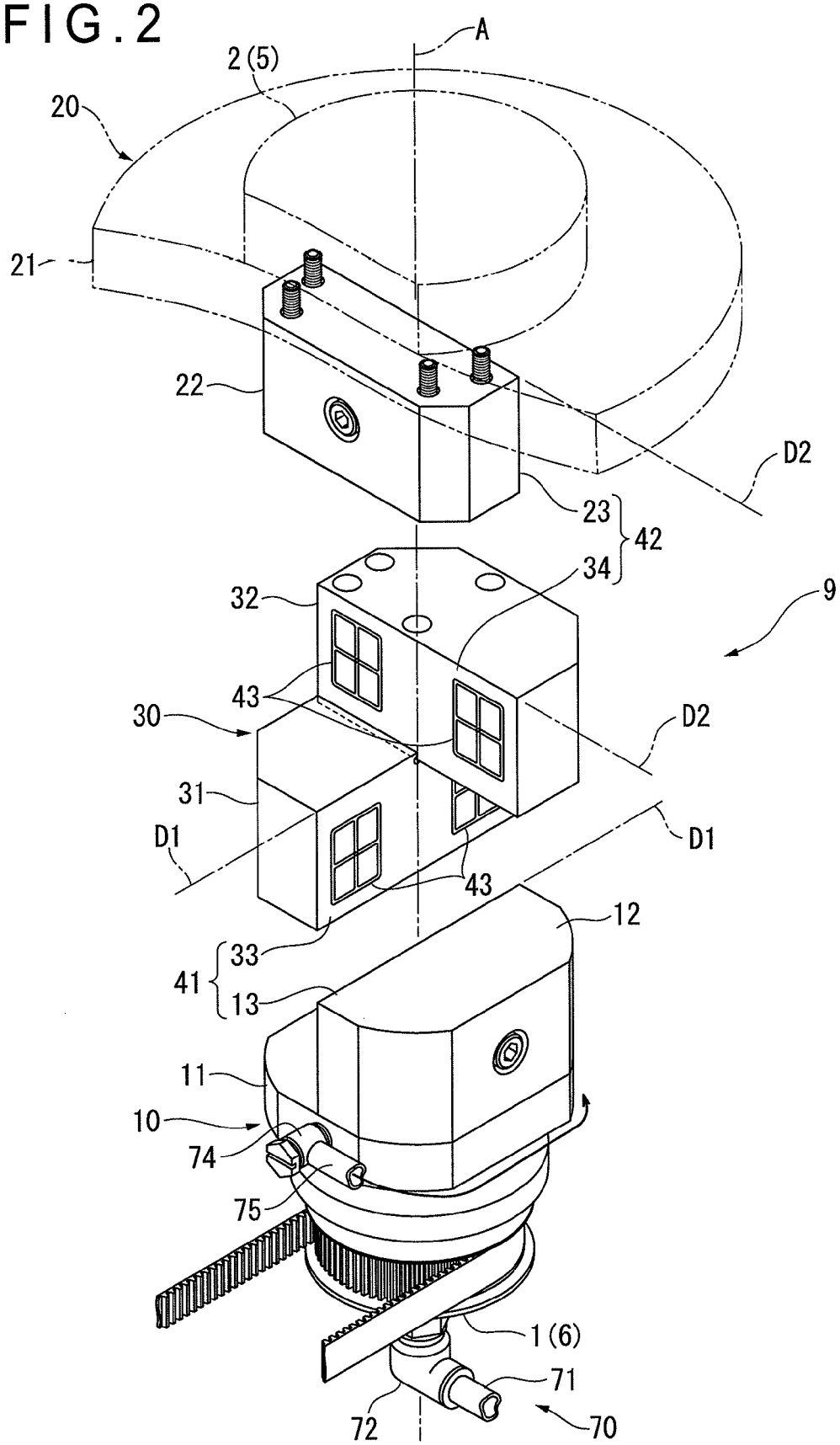
FIG. 2 is an exploded perspective view showing the first exemplary embodiment.

As shown in FIG. 2, the rotation transmitter 9 includes: a first member 10 connected to the rotary member 1 (the driving shaft 6 on a lower side of the drawing); a second member 20 connected to the rotary member 2 (the rotary shaft 5 on an upper side of the drawing); and an intermediate member 30 interposed between the first member 10 and the second member 20.

The first member 10 includes: a disk-shaped first member body 11 whose center is aligned with the rotation axis A; and a first connection block 12 fixed on a first surface of the first member body 11.

A side surface of the first connection block 12 is defined as a first bearing surface 13.

The first bearing surface 13 is a planar surface that is coplanar with the rotation axis A and extends in a first direction D1 (a radial direction from the rotation axis A (center)) orthogonal to the rotation axis A. The first bearing surface 13 is finished to a high flatness.

A second surface of the first member body 11, which is an opposite surface from the first connection block 12, is fixed to an end of the rotary member 1 (the driving shaft 6, see FIG. 1).

As shown in FIG. 1, the driving shaft 6 is supported by the frame 8 through a ball bearing. Accordingly, the first member 10 fixed to the end of the driving shaft 6 is rotatable together with the driving shaft 6.

The second member 20 includes: a disk-shaped second member body 21 whose center is aligned with the rotation axis A; and a second connection block 22 fixed on a first surface of the second member body 21.

A side surface of the second connection block 22 is defined as a second bearing surface 23.

The second bearing surface 23 is a planar surface that is coplanar with the rotation axis A and extends in a second direction D2 (a radial direction from the rotation axis A (center), which is also orthogonal to the first direction D1) orthogonal to the rotation axis A. The second bearing surface 23 is finished to a high flatness.

A second surface of the second member body 21, which is an opposite surface from the second connection block 22, is fixed to an end of the rotary member 2 (the rotary shaft 5, see FIG. 1).

As shown in FIG. 1, the second member body 21 is a disk having a larger diameter than that of the first member body 11. A lower surface near the periphery of the second member body 21 is supported without contact by the frame 8 through floating magnets. With the lower surface supported by the floating magnets, components from the second member 20 to the turntable 4 are integrally rotatably supported.

The intermediate member 30 forms a first static-pressure air bearing 41 with the first bearing surface 13 of the first member 10 and forms a second static-pressure air bearing 42 with the second bearing surface 23 of the second member 20, as shown in FIGS. 1 and 2.

Figure 3:
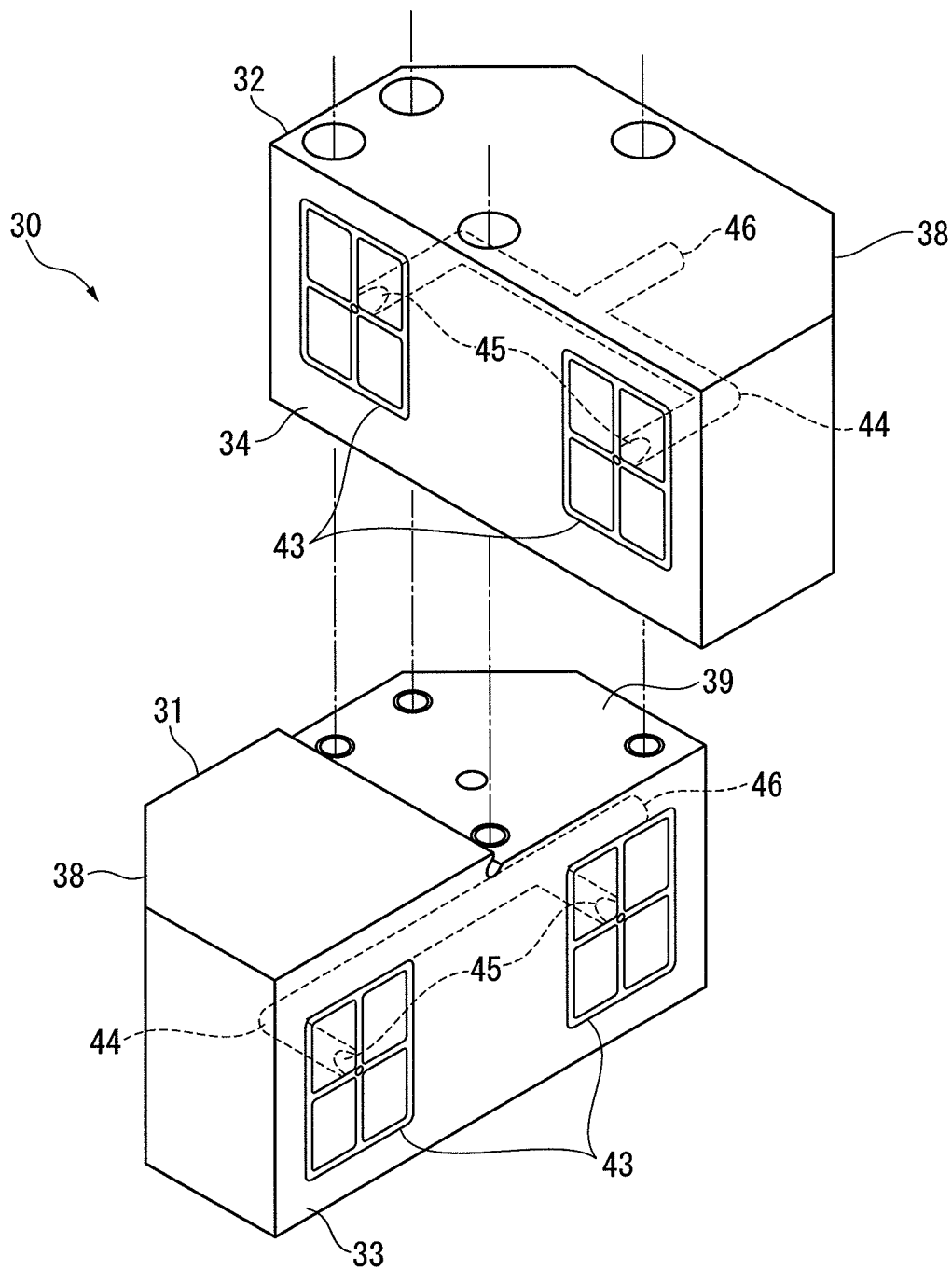
FIG. 3 is an exploded perspective view showing an intermediate member in the first exemplary embodiment.

As shown in FIG. 3, the intermediate member 30 is provided by overlaying a first middle block 31 and a second middle block 32 shifted at a right angle from the first middle block 31, and fastening the first middle block 31 and the second middle block 32 together with bolts.

A side surface of the first middle block 31 is defined as a first middle bearing surface 33.

A side surface of the second middle block 32 is defined as a second middle bearing surface 34.

The first middle bearing surface 33 and the second middle bearing surface 34 are finished to a high flatness.

Herein, the first middle block 31, the second middle block 32, the first connection block 12 of the first member 10, and the second connection block 22 of the second member 20 are each manufactured by processing a similarly shaped metallic block. A seat surface 39 to which the second middle block 32 is fitted is formed on an upper surface of the first middle block 31. Chamfers 38 are appropriately formed at outer corners of the first middle block 31 and the second middle block 32.

In order to provide the first static-pressure air bearing 41 and the second static-pressure air bearing 42, a grid-like air supply groove 43 having four cells is formed on each of the first middle bearing surface 33 and the second middle bearing surface 34. In the first middle block 31 and the second middle block 32, an air supply path 44 is formed serving as a first air supply path for the first middle block 31 and a second air supply path for the second middle block 32.

Figure 4:
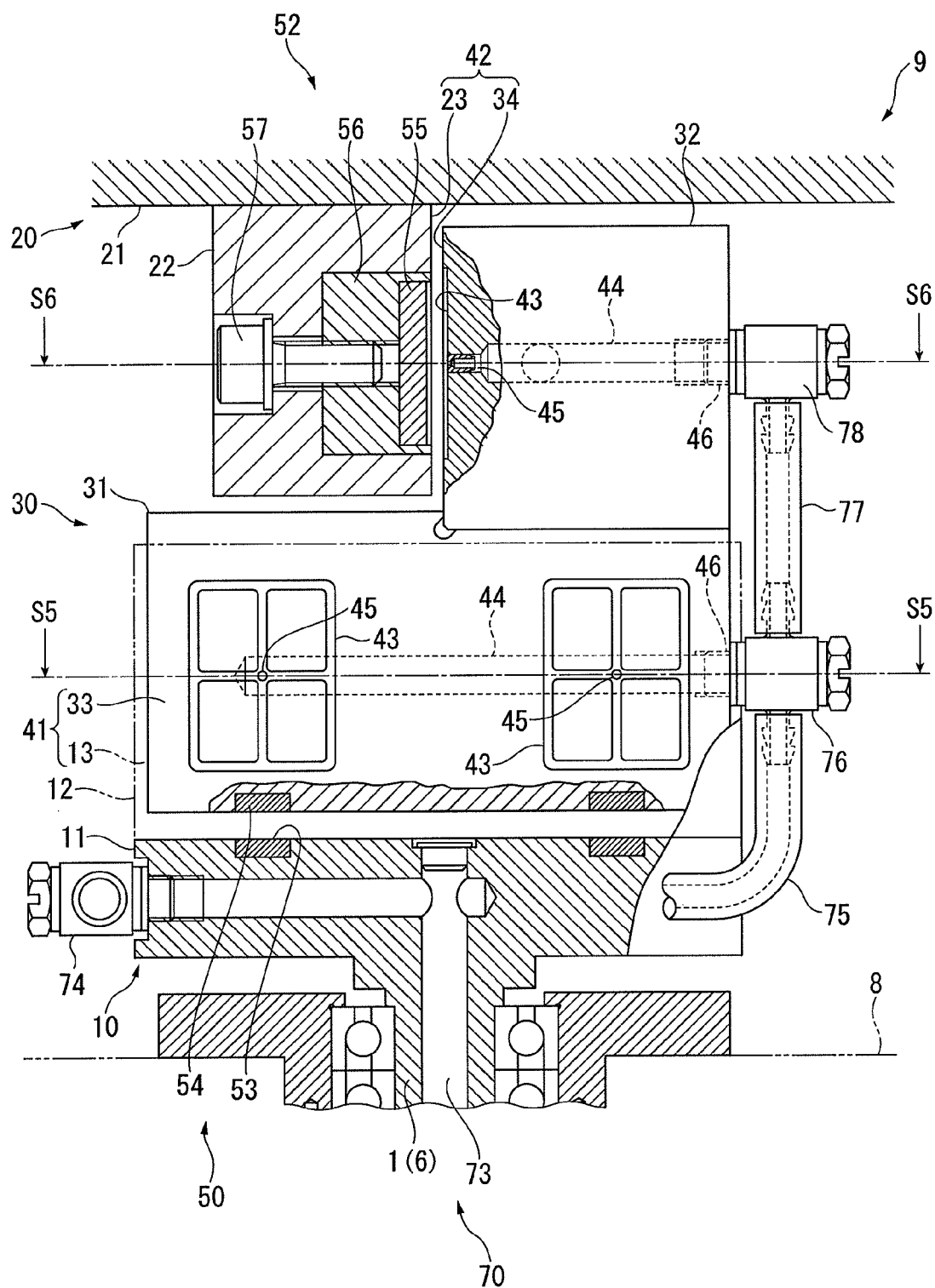
FIG. 4 is an enlarged cross-sectional view showing a relevant part in the first exemplary embodiment.
Figure 5:
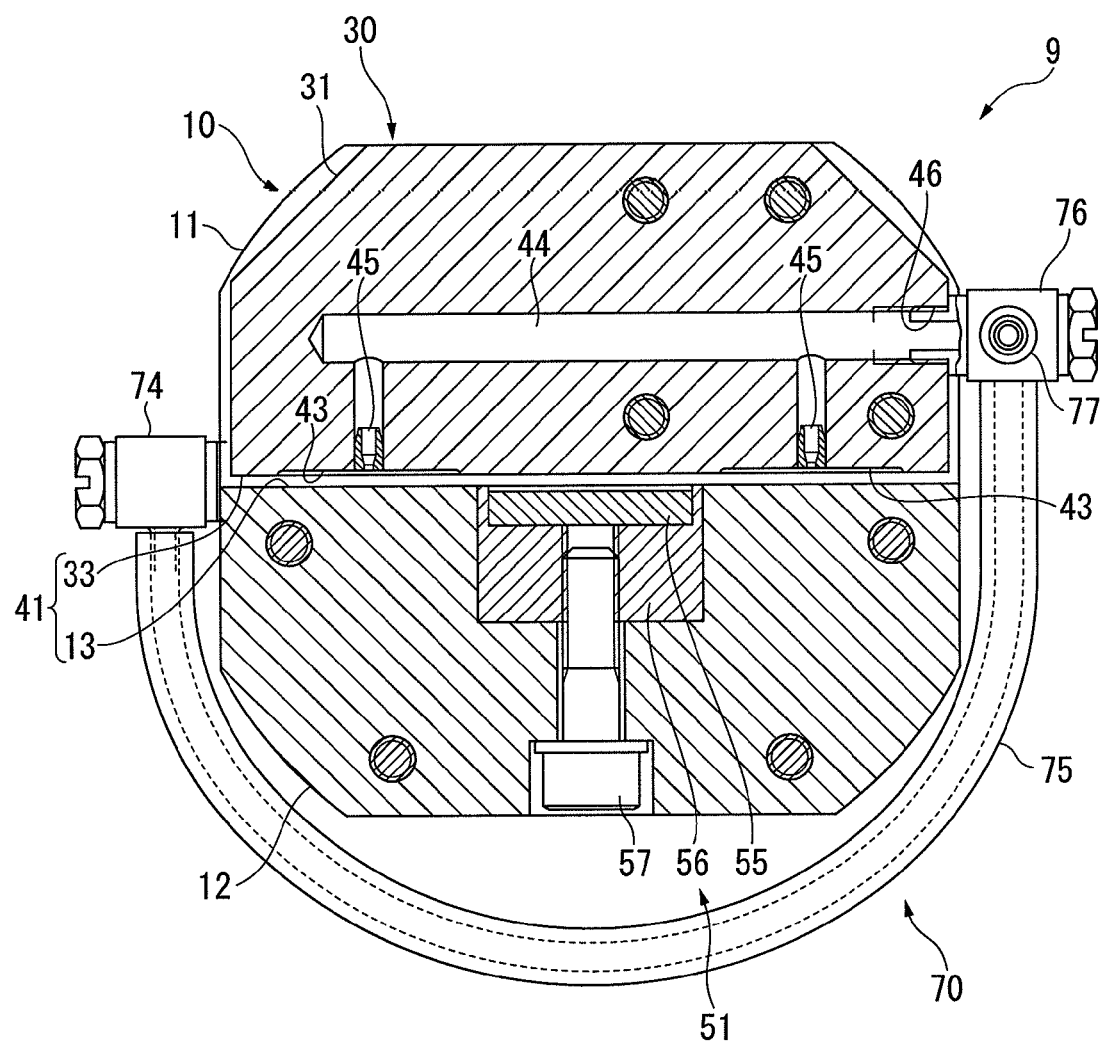
FIG. 5 is a cross-sectional view taken along a line S5 in FIG. 4.
Figure 6:
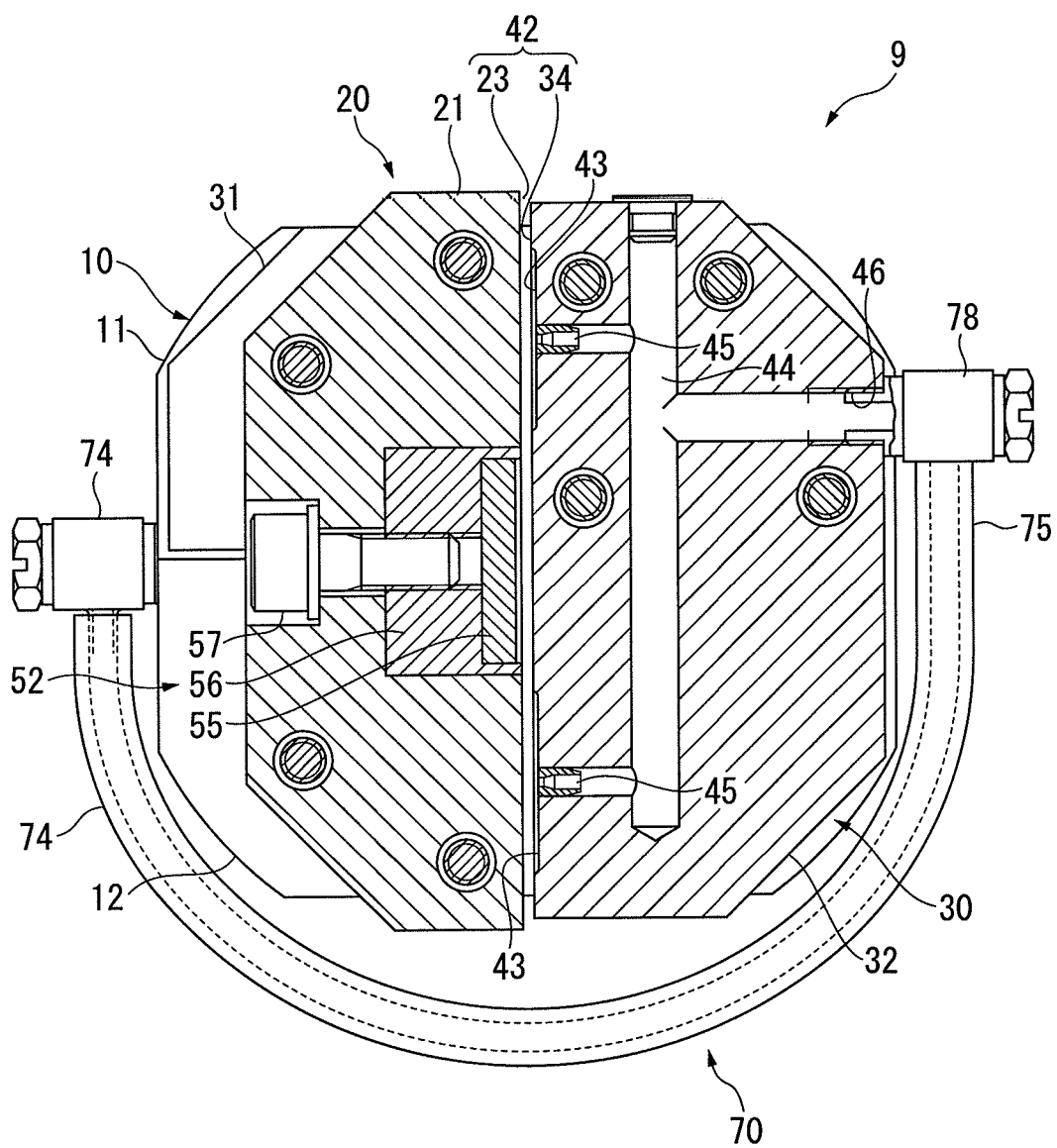
FIG. 6 is a cross-sectional view taken along a line S6 in FIG. 4.

As shown in FIGS. 4 to 6, a first end of the air supply path 44 is opened at the center of the air supply groove 43. A restrictor 45 for forming an orifice is provided to the feeding hole.

In the first middle block 31, a second end of the air supply path 44 is interconnected to a connection port 46 on a side surface of the first middle block 31. In the second middle block 32, a second end of the air supply path 44 is interconnected to a connection port 46 on a back surface of the second middle block 32. These connection ports 46 are tapped so as to be connectable with a coupler of an exterior pneumatic supply circuit 70.

As shown in FIGS. 1 and 2, the intermediate member 30 is interposed between the first member 10 and the second member 20 to provide the rotation transmitter 9.

In this arrangement, the first middle bearing surface 33 of the intermediate member 30 and the first bearing surface 13 of the first member 10 both extend along the first direction D1 and the rotation axis A. Thus, the first static-pressure air bearing 41 can absorb displacement and rotation in a plane along the first direction D1 and the rotation axis A.

The second middle bearing surface 34 of the intermediate member 30 and the second bearing surface 23 of the second member 20 both extend along the second direction D2 and the rotation axis A. Thus, the second static-pressure air bearing 42 can absorb displacement and rotation in a plane along the second direction D2 and the rotation axis A.

Since the first direction D1 and the second direction D2 are shifted at a right angle from each other, and the first static-pressure air bearing 41 and the second static-pressure air bearing 42 are provided by two slide mechanisms, the rotation transmitter 9 according to the first exemplary embodiment serves as an Oldham's coupling.

The rotation transmitter 9 is located such that a vertical direction thereof is aligned with the rotation axis A. The rotation transmitter 9 includes a magnetic floating support device 50 in order to hold the intermediate member 30 between the first member 10 and the second member 20. Moreover, the rotation transmitter 9 also includes a first preload device 51 and a second preload device 52 to respectively apply preload in the first static-pressure air bearing 41 and the second static-pressure air bearing 42.

The floating support device 50 includes: permanent magnets 53 buried in an upper surface of the first member body 11; and permanent magnets 54 buried in a lower surface of the first middle block 31, as shown in FIG. 4.

The permanent magnets 53 are arranged in a circle around the rotation axis A on the upper surface of the first member body 11. the permanent magnets 54 are positioned on the lower surface of the first middle block 31 in a manner to face the arrangement of the permanent magnets 53. The permanent magnets 53 and the permanent magnets 54 are provided such that the same poles thereof face each other, thereby generating mutually repulsive force.

Accordingly, the entire intermediate member 30 including the first middle block 31 is supported by the floating support device 50 in no contact with the first member body 11 and while being floating over the upper surface of the first member body 11.

As shown in FIG. 5, the first preload device 51 has a permanent magnet 55 (a first preload magnet) buried in the first bearing surface 13 of the first member 10. The permanent magnet 55 is held by a holder 56 and fastened with a bolt 57 from a back side of the first connection block 12. The permanent magnet 55 buried in the first bearing surface 13 faces the first middle bearing surface 33 with a predetermined clearance therebetween. The permanent magnet 55 magnetically attracts the first middle block 31 to bias the first bearing surface 13 and the first middle bearing surface 33 in a direction approaching each other.

With the first preload device 51, the first member 10 and the intermediate member 30 can be held at a predetermined position and the first static-pressure air bearing 41 can receive a predetermined preload.

As shown in FIGS. 4 and 6, the second preload device 52 has a permanent magnet 55 (a second preload magnet) buried in the second bearing surface 23 of the second member 20. The permanent magnet 55 is held by the holder 56 and fastened with the bolt 57 from a back side of the second connection block 22. The permanent magnet 55 buried in the second bearing surface 23 faces the second middle bearing surface 34 with a predetermined clearance therebetween. The permanent magnet 55 magnetically attracts the second middle block 32 to bias the second bearing surface 23 and the second middle bearing surface 33 in a direction approaching each other.

With the second preload device 52, the second member 20 and the intermediate member 30 are held at a predetermined position and the second static-pressure air bearing 42 can receive a predetermined preload.

As described above, the lower surface of the intermediate member 30 is supported by the floating support device 50 without contact. On the other hand, the intermediate member 30 is magnetically attracted toward the first member 10 and the second member 20 respectively by the first preload device 51 and the second preload device 52 to be held at a predetermined position. Accordingly, the intermediate member 30 is kept between the first member 10 and the second member 20 at a predetermined status, so that the arrangement of the rotation transmitter 9 can be kept.

Herein, the predetermined status of the intermediate member 30 positioned between the first member 10 and the second member 20 refers to a status in which the first bearing surface 13 and the second bearing surface 23 are coplanar with the rotation axis A while the first middle bearing surface 33 and the second middle bearing surface 34 are coplanar with the rotation axis A, in other words, an arrangement in which the rotation axis A is aligned with an inner corner of the intermediate member 30 at which the first middle block 31 and the second middle block 32 intersect with each other (see FIG. 2).

With such an arrangement of the intermediate member 30 in the rotation transmitter 9, a first static-pressure air bearing 41 is formed between the first bearing surface 13 and the first middle bearing surface 33 and the second static-pressure air bearing 42 is formed between the second bearing surface 23 and the second middle bearing surface 34. The first static-pressure air bearing 41 and the second static-pressure air bearing 42 provide or achieve an Oldham's coupling. Moreover, since the first static-pressure air bearing 41 and the second static-pressure air bearing 42 do not contact with each other, transmission of mechanical vibration can be completely eliminated.

In order that the rotation transmitter 9 functions as the Oldham's coupling, it is necessary to externally supply pressurized air to the first static-pressure air bearing 41 and the second static-pressure air bearing 42.

For this purpose, the air supply paths 44 are formed in each of the first middle block 31 and the second middle block 32.

An exterior pneumatic supply circuit 70 for supplying pressurized air is connected to the air supply paths 44.

The exterior pneumatic supply circuit 70 has a tube 71 to which pressurized air is externally supplied as shown in FIGS. 1 and 2. The tube 71 is connected to an end of the driving shaft 6 (the rotary member 1) through a rotatable coupler 72.

As shown in FIGS. 4 to 6, an axial air supply path 73 is formed inside the rotary member 1. The axial air supply path 73 extends into the first member body 11 along a center axial line of the rotary member 1 (i.e., along the rotation axis A) and is interconnected to the tube 75 through the coupler 74 connected to the side surface of the first member body 11. The tube 75 is connected to the coupler 76 connected to the connection port 46 of the first middle block 31 and, as shown in FIG. 4, is connected to the coupler 78 connected to the connection port 46 of the second middle block 32 through a tube 77.

With the exterior pneumatic supply circuit 70, pressurized air from an external pressurized-air supply source can be introduced to the first middle block 31 and the second middle block 32 through the tubes 71, 75 and 77 to be supplied to the first static-pressure air bearing 41 and the second static-pressure air bearing 42.

In this arrangement, since the coupler 72 is rotatable, even when the driving shaft 6 (the rotary member 1) and the rotation transmitter 9 rotate, the tube 71 can be kept connected to the external pressurized-air supply source.

On the other hand, since other parts of the exterior pneumatic supply circuit 70 including the tubes 75 and 77 are externally unconnected, the other parts can rotate together with the rotation transmitter 9.

In the above exemplary embodiment, rotation is transmitted from the first member 10 to the intermediate member 30 through the first static-pressure air bearing 41 while the rotation is transmitted from the intermediate member 30 to the second member 20 through the second static-pressure air bearing 42.

The first static-pressure air bearing 41 is displaceable in the first direction D1 and in a direction of the rotation axis A while the second static-pressure air bearing 42 is displaceable in the second direction D2 and in the direction of the rotation axis A. Accordingly, in the first member 10 and the second member 20, a high follow-up performance in response to the angular misalignment, parallel misalignment and axial displacement of the rotation axes and a high rigidity as a static-pressure air bearing are obtained, rotation can be transmitted at a high accuracy.

Further, since each of the first static-pressure air bearing 41 and the second static-pressure air bearing 42 is provided by a single side of each of the first member 10 and the second member 20 and the opposing sides of the intermediate member 30, the arrangement of each of the first static-pressure air bearing 41 and the second static-pressure air bearing 42 can be easily manufactured and adjusted unlike an arrangement of a conventional static-pressure air bearing including a pair of a concave component and a convex component to be fitted to each other.

Each of the first static-pressure air bearing 41 and the second static-pressure air bearing 42 is provided by a single side of each of the first member 10 and the second member 20 and the opposing sides of the intermediate member 30. Further, by including the first preload device 51 and the second preload device 52, the first static-pressure air bearing 41 and the second static-pressure air bearing 42 can reliably maintain the clearance and obtain preload as a static-pressure air bearing.

Thus, the rotation transmitter 9 according to the first exemplary embodiment can exhibit a high rigidity and a high accuracy and can be easily manufactured and adjusted.

In the exemplary embodiment, the first member 10 is provided by fixing the first connection block 12 to the first member body 11 and the second member 20 is provided by fixing the second connection block 22 to the second member body 21. The intermediate member 30 is provided by connecting the first middle block 31 and the second middle block 32. Thus, a basic structure of the rotation transmitter 9 can be easily produced by separately manufacturing these blocks and subsequently connecting the blocks.

Particularly, these blocks are connected by being fastened with bolts or the like, which further facilitates the manufacturing of the rotation transmitter 9 as compared with the manufacturing thereof by bonding, welding and other means.

Further, in the first exemplary embodiment, the first connection block 12, second connection block 22, first middle block 31 and second middle block 32 are designed to have the same outline dimension and to be manufactured of the same block material. Accordingly, the manufacturing cost can be further reduced.

In the exemplary embodiment, since the first preload device 51 and the second preload device 52 are respectively provided by a first preload magnet and a second preload magnet in a form of the permanent magnet 55, the first static-pressure air bearing 41 and the second static-pressure air bearing 42 can reliably maintain the clearance and perform preloading.

In this arrangement, since the first preload device 51 and the second preload device 52 can perform preloading using the magnets without contact, transmission of vibration and transmission of external force in a direction other than a preload direction can be reliably blocked.

Since the permanent magnet 55 is used as the first preload magnet and the second preload magnet, the first preload device 51 and the second preload device 52 can be easily manufactured and maintained. Further, since the permanent magnet 55 is buried at a position of each of the first member 10 and the second member 20 respectively facing the first static-pressure air bearing 41 and the second static-pressure air bearing 42, the structure of the first preload device 51 and the second preload device 52 can be simplified with no projection and interference thereof with the surroundings can be avoided.

In the first exemplary embodiment, since the rotation axis A is vertically arranged, the load of the intermediate member 30 needs to be received by the first member 10 located under the intermediate member 30. However, since the floating support device 50 with use of the permanent magnets 53 and 54 is provided between the first member 10 and the intermediate member 30, the intermediate member 30 can be supported in no contact with the first member 10 and in a floating state. Accordingly, the retainer in the aforementioned Patent Literature 1 can be omitted. Further, since the floating support device 50 allows non-contact support, transmission of vibration in conjunction with the operation can be blocked.

In the first exemplary embodiment, pressurized air is externally supplied through the coupler 72 rotatable around the rotation axis A and the axial air supply path 73. Accordingly, even when the first member 10, second member 20 and intermediate member 30 rotate together, the pressurized air can be supplied without the tubes and the like being tangled. Since the pressurized air is thus supplied, the retainer in the aforementioned Patent Literature 1 can be omitted.

In the first exemplary embodiment, the air supply path 44 (the first air supply path) interconnected to the axial air supply path 73 for supplying pressurized air to the first static-pressure air bearing 41, and the air supply path 44 (the second air supply path) interconnected to the axial air supply path 76 for supplying pressurized air to the second static-pressure air bearing 42 are provided inside the intermediate member 30. Accordingly, the pressurized air supplied from the exterior pneumatic supply circuit 70 is distributed to the air supply paths 44 (the first and second air supply paths) to be supplied to the first static-pressure air bearing 41 and the second static-pressure air bearing 42.

Herein, in the exterior pneumatic supply circuit 70, a part from the axial air supply path 73 to the coupler 78 is isolated from a part externally connected by the coupler 72 and the tube 71. Accordingly, the part from the axial air supply path 73 to the coupler 78 can be rotated together with the first member 10 and the intermediate member 30.

Second Exemplary Embodiment

FIGS. 7 to 10 show a second exemplary embodiment of the invention.

A basic structure of a rotation transmitter 9A according to the second exemplary embodiment is the same as that of the rotation transmitter 9 according to the first exemplary embodiment and is given with the same reference numerals in which overlapping description of the components will be omitted. A difference will be described below.

The first static-pressure air bearing 41 and the second static-pressure air bearing 42 in the first exemplary embodiment are orifice restrictors, specifically in which the grid-like air supply groove 43 is formed on each of the first middle bearing surface 33 and the second middle bearing surface 34 and the restrictor 45 forming an orifice is installed in the feeding hole at the center of the air supply groove 43.

In contrast, a first static-pressure air bearing 41A and a second static-pressure air bearing 42A according to the second exemplary embodiment are surface restrictors.

Figure 7:
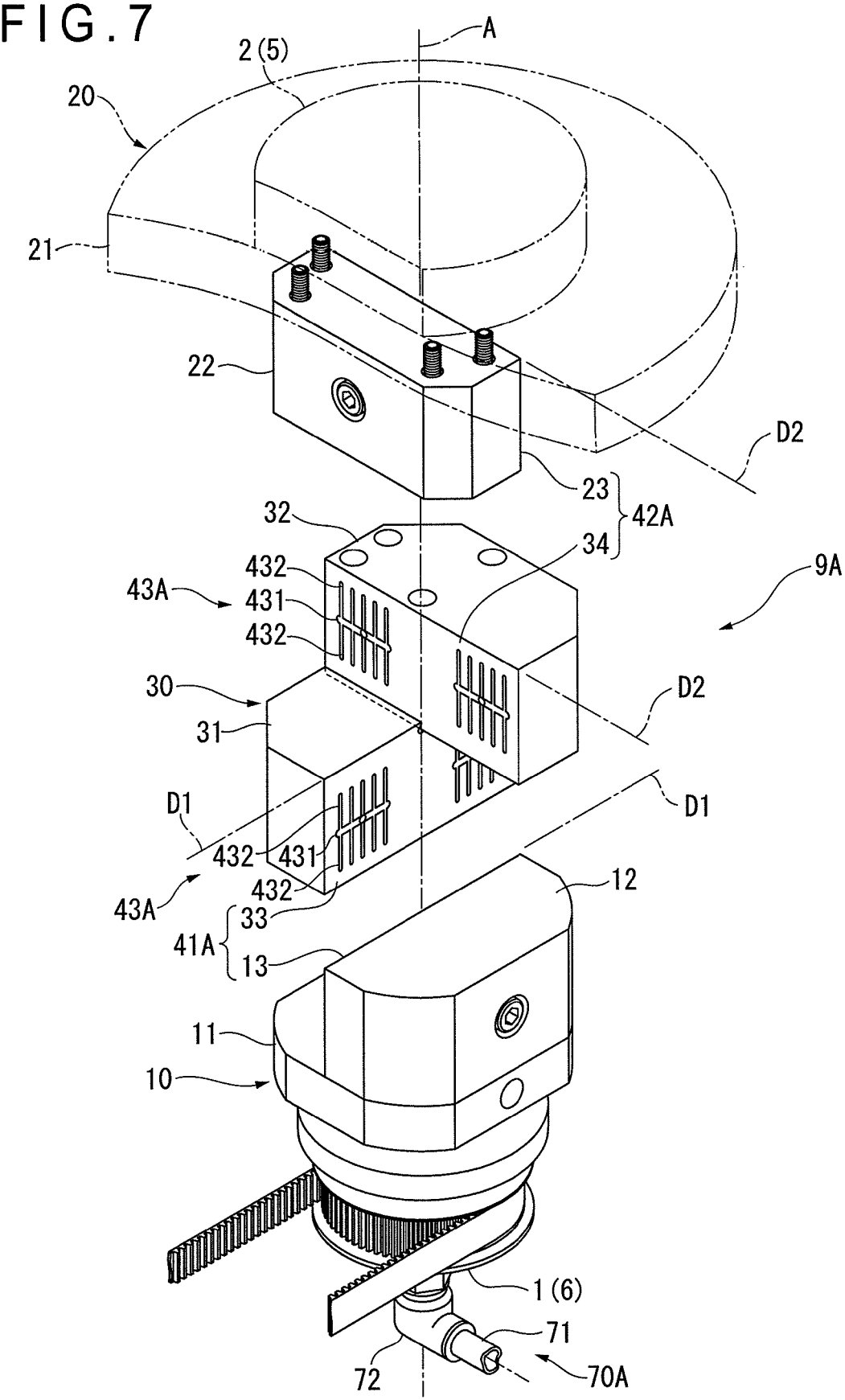
FIG. 7 is an exploded perspective view showing a second exemplary embodiment of the invention.
Figure 8:
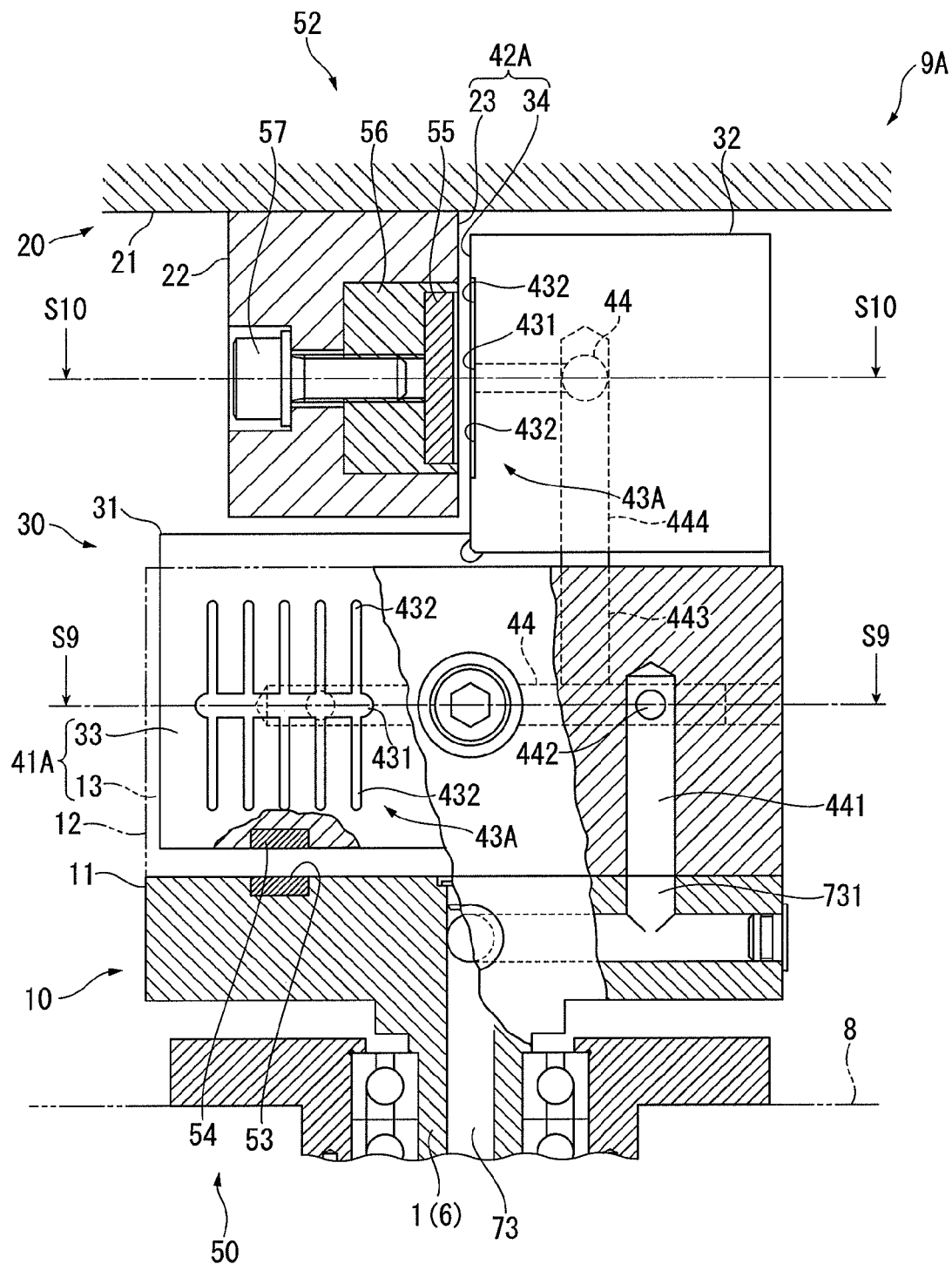
FIG. 8 is an enlarged cross-sectional view showing a relevant part in the second exemplary embodiment.

As shown in FIGS. 7 and 8, a wide main supply groove 431 that laterally extends and a number of branch supply grooves 432 that extend toward both sides of the main supply groove 431 are formed on the first middle bearing surface 33 and the second middle bearing surface 34. Moreover, the restrictor 45 forming an orifice is not installed in the feeding hole at the center of the main supply groove 431.

Even by the first static-pressure air bearing 41A and the second static-pressure air bearing 42A, the same performance as in the first static-pressure air bearing 41 and the second static-pressure air bearing 42 can be obtained.

In the first static-pressure air bearing 41A and the second static-pressure air bearing 42A which are surface restrictors, a restricting effect is obtained in and around the branch supply groove 432, whereby the main supply groove 431 is filled with pressurized air under a pressure equal to that in the air supply path 44.

In the first exemplary embodiment, the exterior pneumatic supply circuit 70 extending from the tube 71 connected to the exterior component to the coupler 78 on the side surface of the second member 20 is used. In an exterior pneumatic supply circuit 70A according to the second exemplary embodiment, although the externally connected tube 71, the coupler 72 and the axial air supply path 73 are the same, a path leading to the first static-pressure air bearing 41A and the second static-pressure air bearing 42A posterior to the axial air supply path 73 is different: air supply paths 441 to 444 are formed inside the first member 10 and the intermediate member 30.

Figure 9:
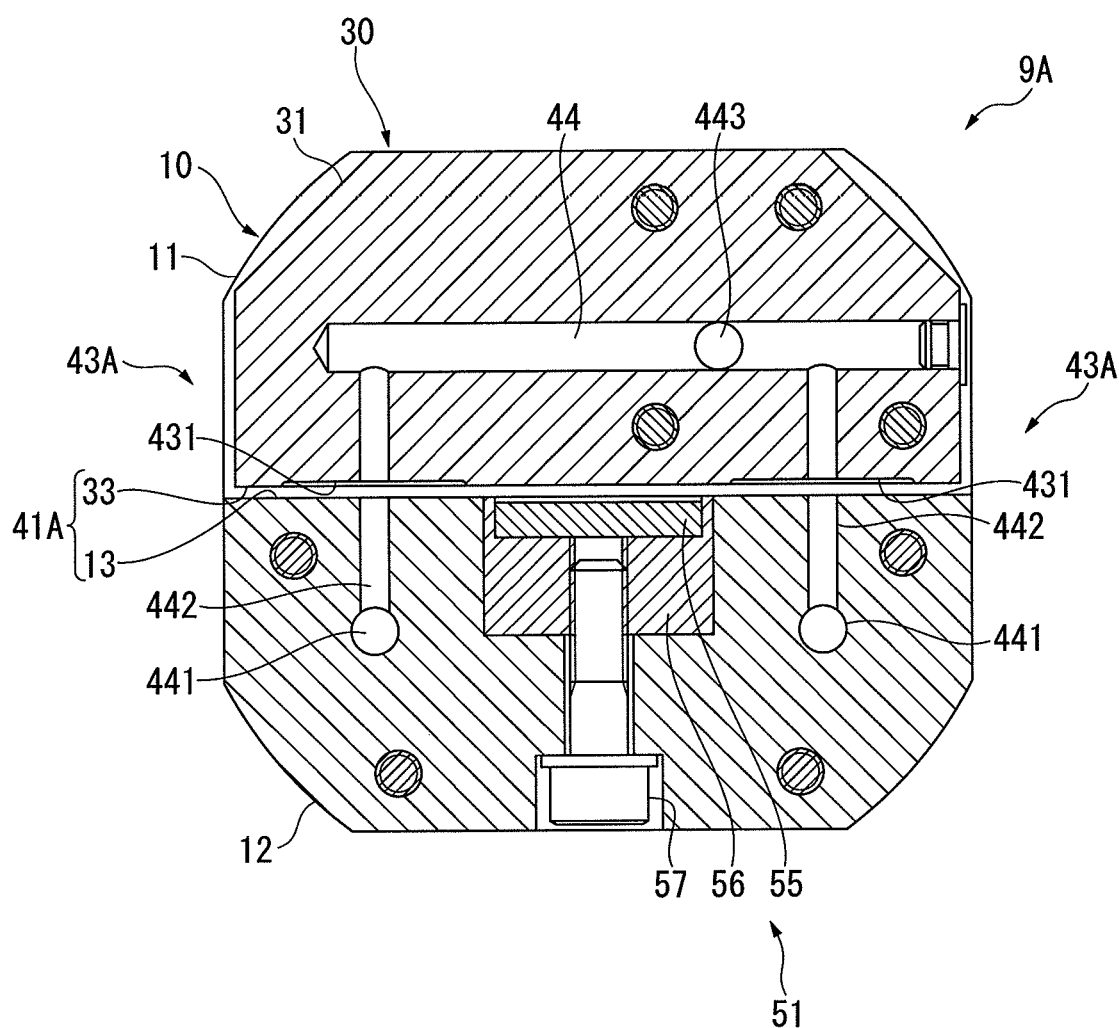
FIG. 9 is a cross-sectional view taken along a line S9 in FIG. 8.

As shown in FIGS. 8 and 9, the air supply path 441 extending in the rotation axis A direction is formed in the first connection block 12 and an end of the air supply path 441 serves as a connection hole to a lower surface of the first connection block 12. An end of a branch 731 interconnected to the axial air supply path 73 serves as a connection hole at a position corresponding to the air supply path 441, on an upper surface of the first member body 11. The air supply path 441 is supplied with the pressurized air from the exterior pneumatic supply circuit 70A.

The air supply path 442 interconnected to the air supply path 441 is formed in the first connection block 12 and an end of the air supply path 442 serves as a connection hole to the first bearing surface 13. A feeding hole position of the air supply path 442 on the first bearing surface 13 is designed to face the main supply groove 431 of the first static-pressure air bearing 41A formed on the opposing first middle bearing surface 33. The pressurized air in the air supply path 441 is supplied to the first static-pressure air bearing 41A through the air supply path 442.

As shown in FIGS. 8 and 9, in the first middle block 31, an air supply groove 43A including the main supply groove 431 is formed on the first middle bearing surface 33, and further, the air supply path 44 interconnected to the main supply groove 431 is formed in the first middle block 31. The air supply path 443 extending toward the second middle block 32 is interconnected to the air supply path 44 of the first middle block 31.

Figure 10:
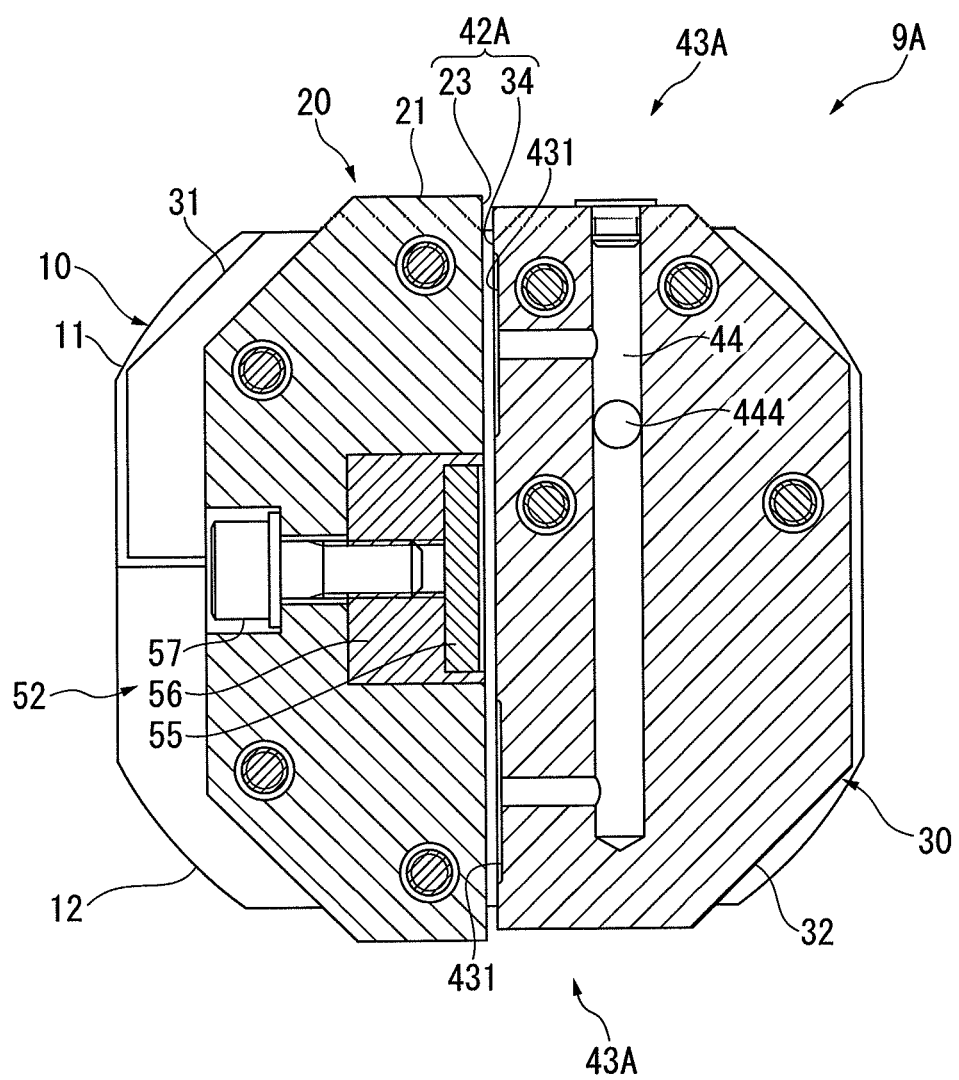
FIG. 10 is a cross-sectional view taken along a line S10 in FIG. 8.

As shown in FIGS. 8 and 10, in the second middle block 32, the air supply groove 43A including the main supply groove 431 is formed on the second middle bearing surface 34, and further, the air supply path 44 interconnected to the main supply groove 431 is formed in the second middle block 32. The air supply path 444 extending toward the first middle block 31 is interconnected to the air supply path 44 of the second middle block 32.

The air supply path 443 of the first middle block 31 and the air supply path 444 of the second middle block 32 are formed at positions for the air supply paths 443 and 444 to be interconnected to each other when the intermediate member 30 is assembled.

Accordingly, the pressurized air supplied to the first static-pressure air bearing 41A through the air supply paths 441 and 442 in the first connection block 12 is introduced to the air supply path 44 in the first middle block 31 through the main supply groove 431 (see FIGS. 8 and 9), and further is supplied to the second static-pressure air bearing 42A through the air supply paths 443 and 444 (see FIGS. 8 and 10).

Also in the second exemplary embodiment as described above, the same advantageous effects as those according to the first exemplary embodiment can be obtained.

Further, in the second exemplary embodiment, since the air supply paths 441 to 444 passing inside the first member 10 and the intermediate member 30 through the first static-pressure air bearing 41A (surface restrictor) are formed, the tubes 75 and 77 or the couplers 74, 76 and 78, which are exposed to the outside, can be omitted and be avoided from interfering with the surroundings.

Modification(s)

The invention is not limited to the exemplary embodiments as described above, but may include any modification or improvement as long as an object of the invention can be achieved.

In the aforementioned exemplary embodiments, the air supply grooves 43 and 43A respectively forming the first static-pressure air bearings 41 and 41A and the second static-pressure air bearings 42 and 42A are formed on the intermediate member 30 (the first middle bearing surface 33 and the second middle bearing surface 34), but the air supply grooves 43 and 43A may be formed on the first member 10 and the second member 20 (the first bearing surface 13 and the second bearing surface 23).

The first static-pressure air bearings 41 and 41A and the second static-pressure air bearings 42 and 42A are not limited to an orifice restrictor or a surface restrictor, but may be an air bearing of the other type as long as being capable of transmitting load in non-contact through an air film.

The first member 10, second member 20 and intermediate member 30 are provided not only by fastening the blocks with the bolts as described in the above exemplary embodiments, but may be provided by bonding or welding the blocks. Moreover, each of the first member 10, second member 20 and intermediate member 30 may alternatively be cut out or molded into a single body.

The first member 10, second member 20 and intermediate member 30 are made not only of general steel, but also of a light-weighted aluminum alloy, a synthetic resin or a fiber-reinforced synthetic resin.

In the exemplary embodiments, the first preload device 51 and the second preload device 52 are respectively provided by the first preload magnet and the second preload magnet (i.e., the permanent magnet 55). However, the first preload device 51 and the second preload device 52 each may be provided by a biasing means using a resilient/elastic member instead of the magnets.

In the first exemplary embodiment, each of the first preload device 51 and the second preload device 52 is provided by holding the permanent magnet 55 with the holder 56 and fastening the holder 50 with the bolt 57 to the second connection block 22 and the like (see FIG. 4).

Figure 11:
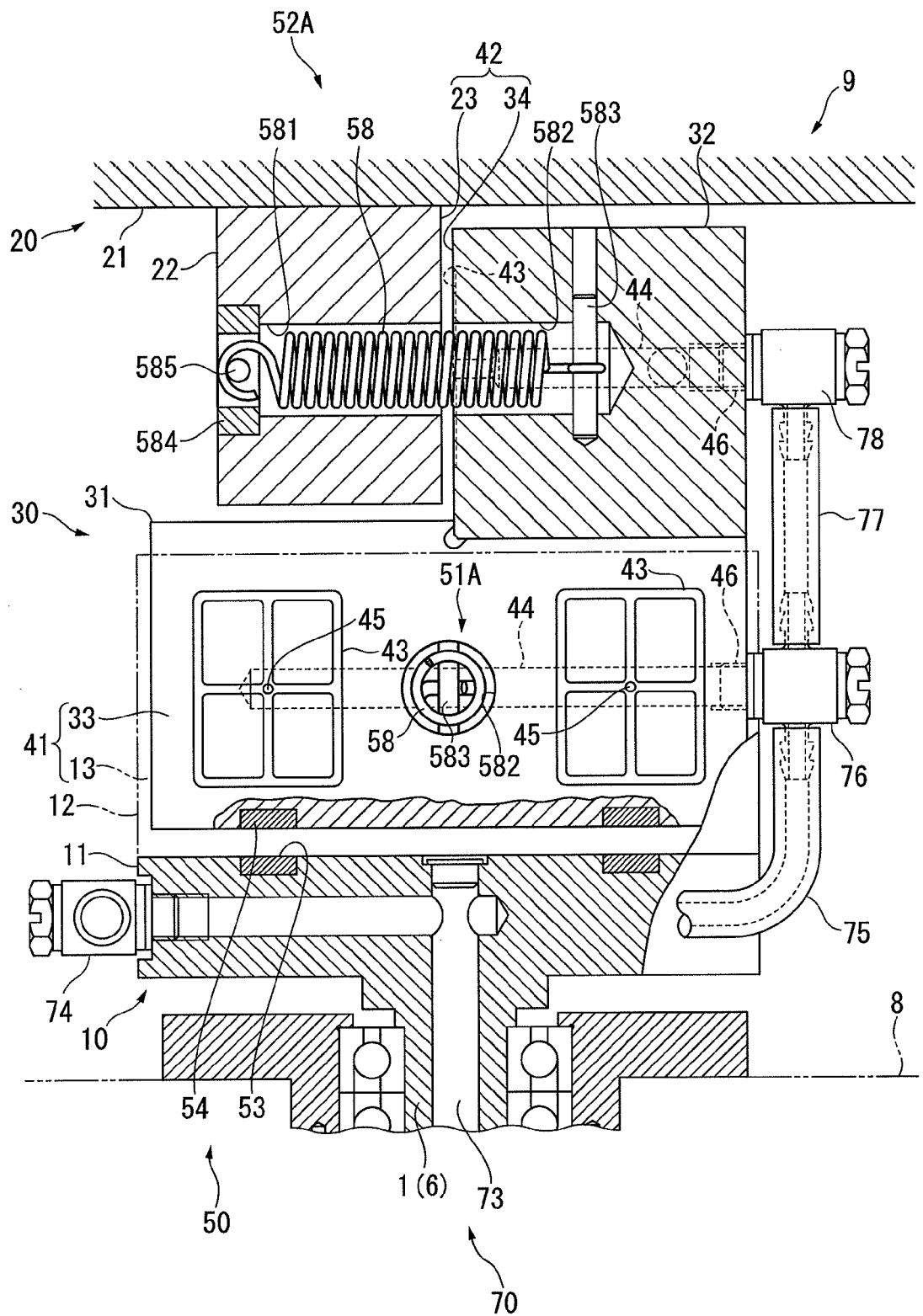
FIG. 11 is a cross-sectional view corresponding to FIG. 4 showing a modification of the invention.

FIG. 11 shows a cross section corresponding to the cross section shown in FIG. 4 according to the first exemplary embodiment.

In FIG. 11, the first member 10, second member 20 and intermediate member 30 are the same as those in the first exemplary embodiment. However, a first preload device 51A between the first member 10 and the intermediate member 30 and a second preload device 52A between the second member 20 and the intermediate member 30 are replaced by coil springs 58.

In FIG. 11, for instance, when the second preload device 52A is described, a coil-spring housing hole 581 is formed in the second connection block 22 of the second member 20 while a coil-spring housing hole 582 is formed in the second middle block 32 of the intermediate member 30. The coil-spring housing holes 581 and 582 are respectively formed substantially at the center of the second bearing surface 23 and the second middle bearing surface 34 and are coaxially positioned when the second member 20 and the intermediate member 30 are assembled.

In the second middle block 32, a locking pin 583 that traverses the coil-spring housing hole 582 is provided. An end ring 584 interconnected to the coil-spring housing hole 581 is provided on a back surface of the second connection block 22. A locking pin 585 that traverses the coil-spring housing hole 581 is provided to the end ring 584.

For installing the coil spring 58, a first end of the coil spring 58 is initially introduced into the coil-spring housing hole 582 from the second middle bearing surface 34 and is locked with the locking pin 583. Next, a second end of the coil spring 58 is introduced to the coil-spring housing hole 581 from the second bearing surface 23. After bringing the second connection block 22 and the second middle block 32 close to each other, the second end of the coil spring 58 is pulled out from the back surface of the second connection block 22 while stretching the coil spring 58. Subsequently, the second end of the coil spring 58 is locked with the locking pin 585 of the end ring 584. Further, the end ring 584 is fixed to the second connection block 22, whereby the coil spring 58 is housed in the coil-spring housing holes 581 and 582 while the both ends of the coil spring 58 are hooked on the locking pins 583 and 585.

With the coil spring 58, the second connection block 22 and the second middle block 32 are biased in a direction approaching each other, so that preload can be applied to a static-pressure air bearing (the second static-pressure air bearing 42, see FIG. 1 and the like) formed between the second bearing surface 23 and the second middle bearing surface 34.

The second preload device 52A is exemplarily described above. The first preload device 51A provided between the first member 10 and the intermediate member 30 can be formed in the same manner.

Further, the first preload device and the second preload device may be structured, for instance, by providing a frame surrounding the first member 10 and the intermediate member 30 or a frame surrounding the second member 20 and the intermediate member 30 and by providing a resilient/elastic member between the frame and each of the members 10, 20 and 30, in which the resilient/elastic member brings the first bearing surface and the first middle bearing surface close to each other or the resilient/elastic member brings the second bearing surface and the second middle bearing surface close to each other.

As a means for supplying the pressurized air to the first static-pressure air bearings 41 and 41A and the second static-pressure air bearings 42 and 42A, the exterior pneumatic supply circuit 70 mainly consisting of the tubes 75 and 77 provided on an outer circumference as described in the first exemplary embodiment, or the internal air supply paths 441 to 444 as described in the second exemplary embodiment are usable. The exterior pneumatic supply circuit and the air supply paths may be partially combined. Alternatively, other arrangements may be used.

However, it is desirable that the exterior tube 71 is introduced to the axial air supply path 73 through the coupler 72 so that the tube 71 is rotatably connected.

What is claimed is:

1. A rotation transmitter interconnecting a pair of rotary members that rotate around a common rotation axis, the rotation transmitter comprising:
   a first member, an intermediate member and a second member that are arranged coaxially with the rotation axis, wherein
   the first member has a first bearing surface formed along the rotation axis and a first direction intersecting with the rotation axis,
   the second member has a second bearing surface formed along the rotation axis and a second direction intersecting with the rotation axis and the first direction,
   the intermediate member has a first middle bearing surface that faces the first bearing surface and a second middle bearing surface that faces the second bearing surface,
   a first static-pressure air bearing is formed between the first bearing surface and the first middle bearing surface and a second static-pressure air bearing is formed between the second bearing surface and the second middle bearing surface,
   the rotation transmitter further comprising: a first preload device that biases the first bearing surface and the first middle bearing surface in a direction approaching each other; and
   a second preload device that biases the second bearing surface and the second middle bearing surface in a direction approaching each other, and
   the first preload device is a first preload magnet that is provided to the first member or the intermediate member and the second preload device is a second preload magnet that is provided to the second member or the intermediate member.

2. The rotation transmitter according to claim 1, wherein the first member comprises: a first member body; and a first connection block that is provided on the first member body near the intermediate member and has the first bearing surface on a side surface of the first connection block,
   the second member comprises: a second member body; and a second connection block that is provided on the second member body near the intermediate member and has the second bearing surface on a side surface of the second connection block, and
   the intermediate member comprises: a first middle block that has the first middle bearing surface on a side surface of the first middle block; and a second middle block that has the second middle bearing surface on a side surface of the second middle block.

3. The rotation transmitter according to claim 1, wherein the rotation axis is vertically disposed, and
   floating magnets repulsive to each other are respectively provided on a surface of the intermediate member and a surface of a vertically lower one of the first member and the second member opposing the surface of the intermediate member.

4. The rotation transmitter according to claim 1, wherein the first member is formed with an axial air supply path that extends along the rotation axis from an end opposite to the intermediate member toward the intermediate member, and
   the axial air supply path is provided with a coupler at an end opposite to the intermediate member, the coupler being rotatable around the rotation axis and being externally supplied with pressurized air.

5. The rotation transmitter according to claim 4, wherein the intermediate member comprises thereinside: a first air supply path that is interconnected to the axial air supply path and supplies the pressurized air to the first static-pressure air bearing; and a second air supply path that is interconnected to the axial air supply path and supplies the pressurized air to the second static-pressure air bearing.

6. The rotation transmitter according to claim 4, wherein the intermediate member comprises thereinside: a first air supply path that is interconnected to the axial air supply path and supplies the pressurized air to the first static-pressure air bearing; and a second air supply path that is interconnected to the first static-pressure air bearing and supplies the pressurized air to the second static-pressure air bearing.

* * * * *